July 29, 1969  A. J. FLECKENSTEIN  3,457,792
TIMING MOTOR MECHANISM FOR CONTROL VALVES AND THE LIKE
Filed Sept. 29, 1967  3 Sheets-Sheet 1

Inventor
Andrew J. Fleckenstein
By Mann, Brown and McWilliams
Attys.

July 29, 1969    A. J. FLECKENSTEIN    3,457,792
TIMING MOTOR MECHANISM FOR CONTROL VALVES AND THE LIKE
Filed Sept. 29, 1967    3 Sheets-Sheet 2

Inventor
Andrew J. Fleckenstein
By Mann, Brown and McWilliams
Attys.

July 29, 1969     A. J. FLECKENSTEIN     3,457,792
TIMING MOTOR MECHANISM FOR CONTROL VALVES AND THE LIKE
Filed Sept. 29, 1967     3 Sheets-Sheet 3

Inventor
Andrew J. Fleckenstein
By
Mann, Brown and McWilliams
Attys.

United States Patent Office 3,457,792
Patented July 29, 1969

3,457,792
TIMING MOTOR MECHANISM FOR CONTROL
VALVES AND THE LIKE
Andrew J. Fleckenstein, 13650 Squirrel Drive,
Brookfield, Wis. 53005
Filed Sept. 29, 1967, Ser. No. 671,825
Int. Cl. F16h *3/74;* H01h *43/20*
U.S. Cl. 74—3.52                    10 Claims

ABSTRACT OF THE DISCLOSURE

Timing mechanism with simplified arrangement of drive gears, time of day indicator, and cycling wheel. The releasable gear to rubber wheel drive provides a simplified periodic driving of an apparatus cycling cam and permits simple facilities for manually actuating the cycling wheel independently of the timing mechanism.

---

The present invention is directed to new and useful improvements in timing mechanisms which are particularly useful for controlling the on and off cycling of apparatus such as is typified by water softener controls.

Many mechanisms of this general type have been used in the past. They usually include some wheel driven by a motor for indicating the time of day and mechanism which is actuated by movement of this wheel to a particular position to initiate the drive of an apparatus cycling wheel (or switch actuating cam) for a preselected period of time. The drive apparatus frequently uses some pawl and ratchet stepping mechanism for causing movement of the apparatus cycling wheel. Apparatus of this type is difficult to actuate manually by means of rotating the time indicating wheel for purposes of inspection and service, when one desires to ascertain the cause of a difficulty in the mechanism. In other forms of apparatus intermeshing gears are caused to be engaged by movement of the time of day indicator to a predetermined position to cause driving of the apparatus cycling wheel. Prior apparatus of this type is subject to the difficulty that unless the teeth of the gears are properly located with respect to one another they may tend to jam so that the apparatus does not function properly. Also, prior apparatus of this general class has been so arranged that it is more difficult than need be to gain access to the mechanism for the purpose of inspection and replacement of parts.

With the foregoing in mind, the major purposes of the present invention are to form a timing mechanism of the foregoing class with a simplified arrangement of drive gears, and the like, to permit ready accessibility for purposes of inspection and repair, to so arrange apparatus of this class that the apparatus can be easily manually cycled through portions of an operating cycle at relatively rapid speeds, to insure a positive drive between the timing motor drive train and the apparatus cycling wheel when the time selector wheel calls for such cycling, and to so arrange apparatus of this class that the apparatus is easily set to the proper time of day and is easily reset for the various portions of the program which is cycled by the apparatus, these and other purposes of the invention being more apparent in the course of the ensuing specification and claims when taken with the accompanying drawings, in which:

Figure 1:
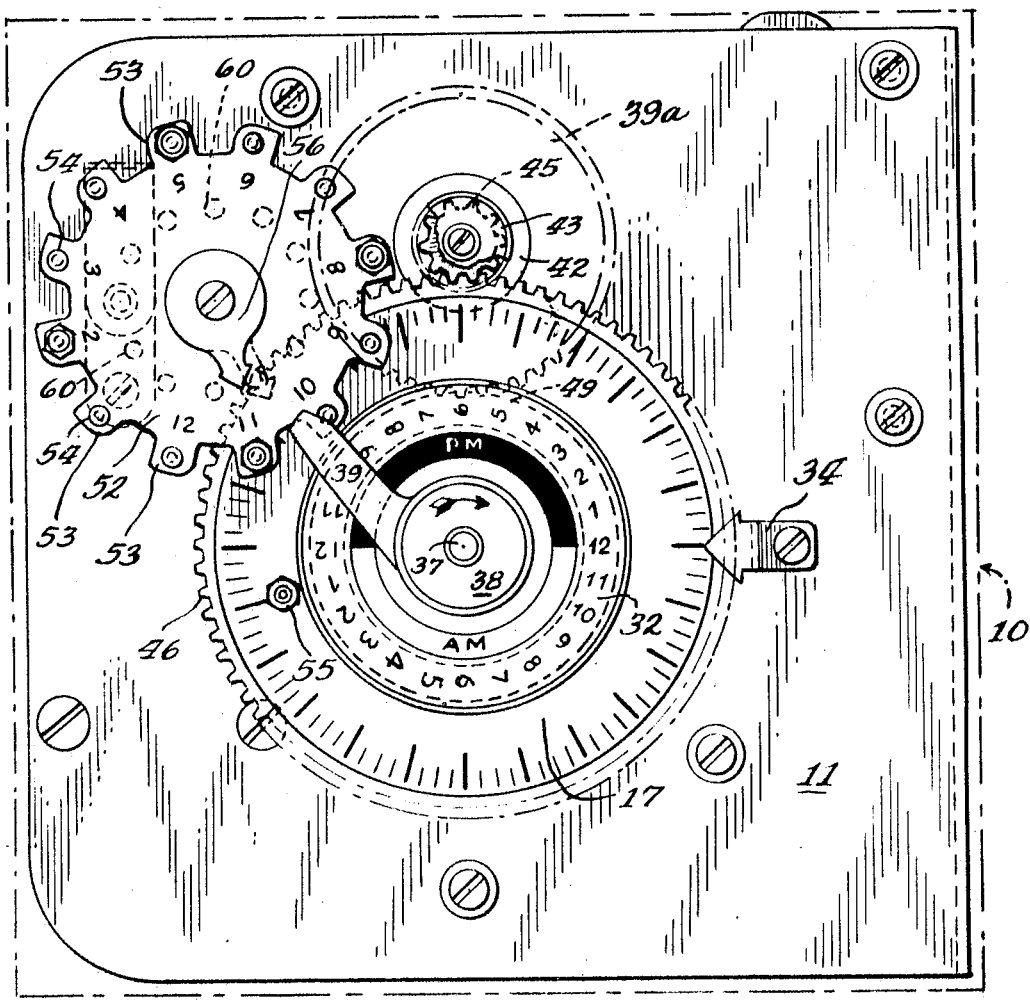
FIGURE 1 is a front view of timing motor apparatus incorporating the principles of the present invention.
Figure 4:
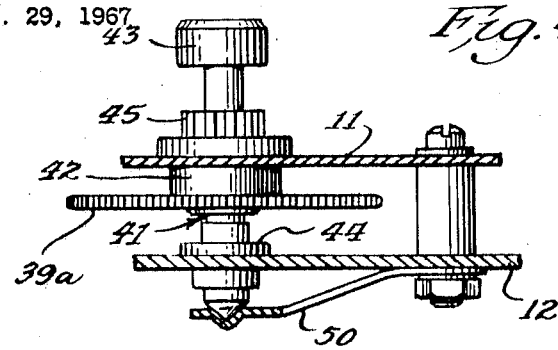
Figure 2:
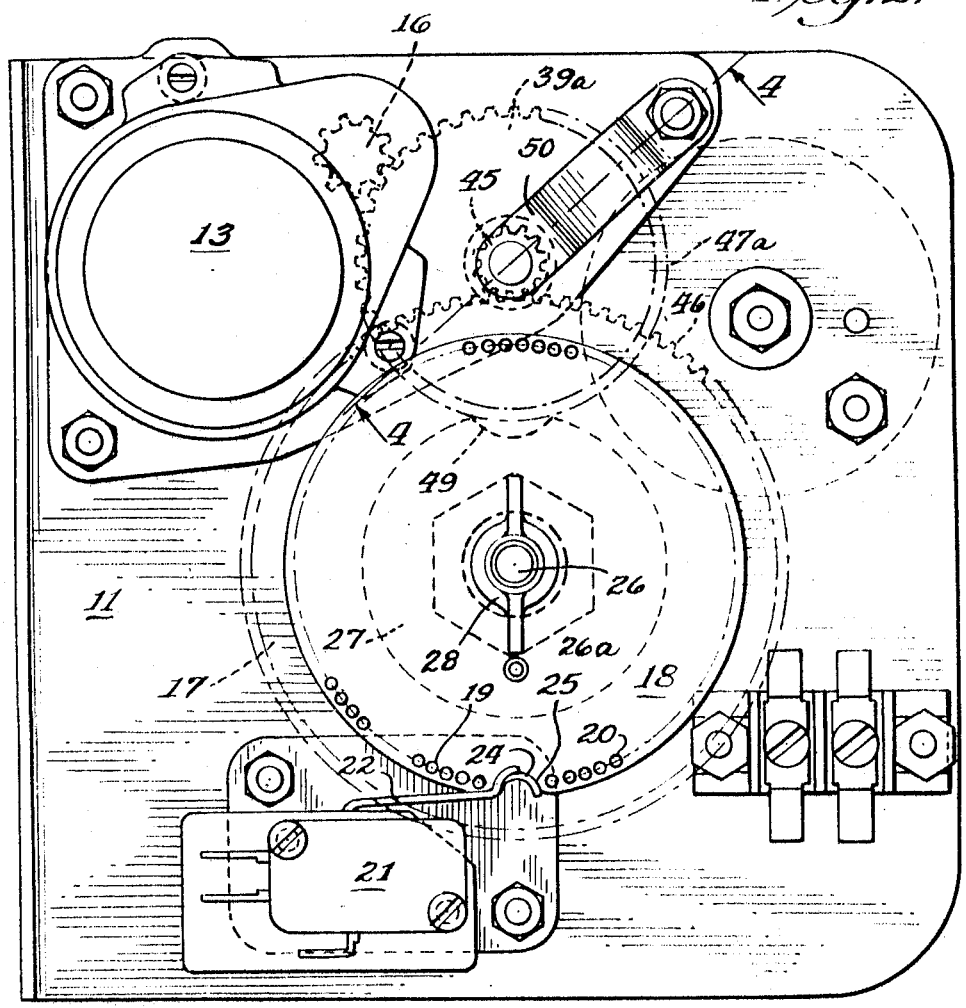
FIGURE 2 is a rear view of the apparatus illustrated in FIGURE 1.
Figure 3:
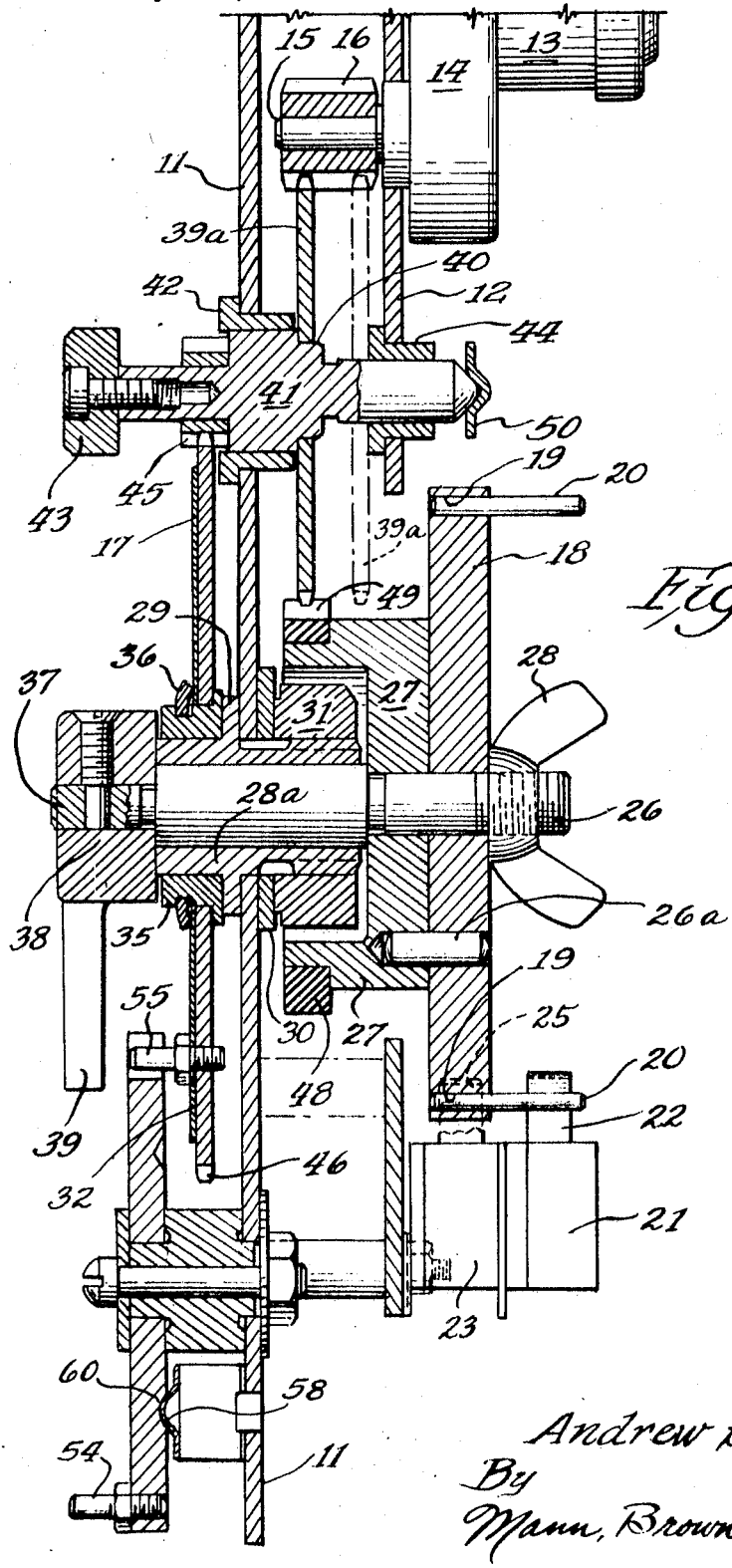

FIGURE 3 is a sectional view of the apparatus illustrated in FIGURES 1 and 2 with certain portions thereof being rotated from their normal positions for purposes of clarity; and FIGURE 4 is a sectional view of certain elements illustrated in FIGURES 1, 2 and 3 and looking in the direction of the arrows 4—4 of FIGURE 2.

Like elements are designated by like characters throughout the specification and drawings.

With specific reference to the drawings, and, in the first instance to FIGURE 1, the numeral 10 generally designates the housing for the timing mechanism to be hereafter described. The housing 10 supports an upstanding main supporting plate 11 which supports the timing mechanism. Housing 10 is shown in dotted outline for the reason that housing 10 may take any one of many forms. The particular form of the housing is of no consequence to the invention.

A second supporting plate 12 is spaced laterally from support plate 11 and is used to support a drive motor which may take the form of a synchronous motor 13 with a step-down gear transmission 14 and an output shaft 15 with a drive gear 16 thereon for purposes of driving a time indicating and time selector wheel 17 and intermittently driving an apparatus cycling wheel 18 in a manner which will be pointed out hereinafter.

Apparatus cycling wheel 18, as is seen best in FIGURE 2, includes a plurality of apertures positioned near the circumference thereof as indicated at 19. Apertures 19 are positioned all the way around the wheel. Pins 20 are adapted to be inserted in selected ones of these apertures for purposes of actuating a first switch 21 having an actuating arm 22 in position to be contacted by the pins 20 as the pins rotate with wheel 18 so as to close the switch 21 at a selected time and to hold it closed for an interval of time determined by the number of pins 20 at a particular location on the wheel 18. For example, if five of pins 20 are positioned at a particular location on wheel 18, the first pin of the series will initially contact switch actuating arm 22 to close switch 21, while holding switch 21 closed until the last pin 20 of the series passes the actuating arm. Thus, the instant of actuation of switch 21 may be determined by selecting the location of a pin or group of pins on wheel 18 and the period at which switch 21 is closed may be determined by the number of pins 20 at any particular location. Thus, through selective positioning of the pins a relatively large number of actuations of switch 21 may be used through one revolution of cycling wheel 18.

A second switch 23 is positioned alongside switch 21 and includes an actuating arm 24 which is adapted to bear against the periphery of wheel 18. Wheel 18 has a gap 25 cut in the periphery at a selected portion thereof so that when wheel 18 is positioned so that this gap overlies the end of actuating arm 24, the end of actuating arm 24 simply rests at the gap 25, and switch 23 is then open. Switch 23 may be utilized to close the energizing circuit for a water softening valve operating motor and to maintain the closure thereof until switch 21, which is in the same energizing circuit for the drive motor, is closed so that the drive motor is energized only as long as the pins 20 hold the actuating arm 22 of switch 21 in closed position. The resiliency of switch arm 24 holds the cycling wheel 18 from accidental drifting when wheel 18 is not being positively driven.

Cycling wheel 18 is removably fixed to a supporting and driving shaft 26 by means of a hub 27 which is fixed to shaft 26 and which is adapted to bear against the inner face of wheel 18. A pin 26a which is removably received within a recess in the hub 27 locks wheel 18 and hub 27 together. Nut 28 is used to hold the cycling wheel 18 against the face of hub 27. Shaft 26 is rotatably mounted in a bearing 28a which is fixed on upstanding support plate 11, as by means of a shoulder 29 bearing against one surface of the plate and a washer 30 bearing against the opposite surface of the plate. Lock nut 31 may be used to hold the bearing in the position illustrated.

Bearing 28a rotatably supports a time selector wheel 17 which is adapted to be driven from timing motor 13 through a gear transmision, to be described, which rotates time selector wheel 17 through one revolution for each twenty-four hours. The face of the time selector wheel 17 may be provided with suitable hour and quarter-hour indicating indicia, as by means of a decal like disc 32, as shown, and a pointer or other indicating device 34 may be utilized to indicate the correct time of day. Time selector wheel 17 is fixed on a hub 35 which bears against shoulder 29. Hub 35 rotates on bearing 28a. A lock ring 36 may be used to hold the selector wheel and its hub in assembled position. The outer end of shaft 26 adjacent to selector wheel 17 has a reduced portion 37 to which is affixed the hub 38 of the actuating arm 39.

Locking ring 36 forces the time indicating disc against wheel 17 tightly enough so that the friction between the disc 32 and face of wheel 17 is sufficient to cause the disc to rotate normally with the wheel 17. The frictional engagement is sufficiently light to enable manual rotation of disc 32 relative to the wheel 17.

The drive from timing motor 13 to the time selector wheel 17 is through a gear 39a which meshes with gear 16. Gear 39a is fixed to a shoulder 40 on idler shaft 41. Shaft 41 is journaled for rotation and for axial movement in a bearing 42 which is fixed in support plate 11. The front end of idler shaft 41 carries a push button or rotatable actuating knob 43, and the rear end of idler shaft 41 is journaled in a bearing 44 carried by support plate 12. Idler shaft 41 has a pinion gear 45 fixed thereto on the front thereof. This gear 45 engages teeth 46 on the periphery of time selector wheel 17 so as to drive the time selector wheel from motor 13.

Gear 39a is adapted to be frictionally engaged with a frictional surface defined by an elastomeric or rubber-like ring 48 carried by hub 27. Ring 48 has a gap cut in the periphery thereof as at 49 (FIGURE 2) for a purpose which will be pointed out.

Idler shaft 41 is normally held in the full line position illustrated in FIGURE 2 by means of a spring leaf 50 which bears against the rear end of idler shaft 41 and forces idler shaft 41 to the full line position illustrated in FIGURE 3 wherein gear 39a abuts against the end of the bearing 42. Upon movement of the idler shaft 41 to the right, under influence of manually applied pressure push against push button 43, gear 39a may be moved to the dotted line position illustrated in FIGURE 3. In this position gear 39a is still engaged with drive gear 16 but it is then out of engagement with the frictional surface 48 and gear 45 is then out of engagement with the gear teeth 46 of the time selector wheel 17.

Hub 27 and frictional surface 48 on the periphery thereof are normally in the full line position of FIGURE 2 and FIGURE 3 wherein the gap 49 in the frictional surface is frontally opposed to the gear teeth 47a of gear 39a so that gear 39a is disengaged from frictional surface 48. In order to shift hub 27 and frictional surface 48 by rotating the same through a few degrees to bring about engagement between the gear teeth 47a and frictional surface 48, a skip-day wheel 52 having a plurality of lugs 53 on the periphery thereof and equally spaced from one another is employed. As illustrated, twelve such lugs are provided on skip-day wheel 52 to indicate twelve days of operation. Each of the lugs 53 carries actuating fingers 54 which are adapted to be moved into the path of actuating arm 39. Fingers 54 are screw threaded into the lugs 53. In the normal inactive position of the cycling wheel 18, arm 39 will be in the position illustrated in FIGURE 1, wherein it extends between the pins 54 of two adjacent lugs 53. The lugs 53 also overlap the arcuate area traversed by an activating member 55 on wheel 17, as is seen in FIGURES 1 and 3, so that when member 55 moves into the area between adjacent lugs, it causes a partial rotation of skip-day wheel 52 sufficient to bring the pin 54 of the adjacent lug against actuating arm 39 and cause a partial movement thereof in the direction of the arrow in FIGURE 1. This movement of actuating arm 39 continues until it is swung out of the path of movement of the pin 54. This engagement between one of the pins 54 and actuating arm 39 causes a few angular degrees of rotation of actuating arm 39 which is sufficient to move the frictional surface 48 of hub 27 into engagement with the teeth of gear 39a. The cycling wheel 18 is then positively driven from the drive motor 13 for a full revolution until gap 49 is again frontally opposed to teeth 47a of gear 39a. This again positions actuating arm 39 in the general position illustrated in FIGURE 1.

The pins 54 and lugs 53 act as clutching elements between time selector wheel 17 and actuating arm 39 so as to cause movement of arm 39 under the influence of member 55 and wheel 17.

A pointer 56 may be utilized to indicate a particular day in a twelve-day cycle. By removing one or more of the pins 54 on one or more particular days represented by each of the lugs 53, the cycling may be skipped for one day. For example, if the pin on lug 53 representing the eleventh day is removed, contact between member 55 and the lug representing the tenth day will rotate the skip-day wheel 52 through a few degrees to bring the lug representing the eleventh day into the position represented by the tenth day lug, but, since the pin 54 is missing from lug 53, actuating arm 39 will remain in the position illustrated in FIGURE 1 so that rotation of cycling wheel 18 is not initiated during this particular day.

In use, the correct time of day is readily set to the indicator 34 by merely pushing in on push button 43 which disengages the drive with time selector wheel 17, and time selector wheel 17 may then be rotated to the correct time setting.

When the mechanism is operating normally, motor 13 drives the time selector wheel 17 until lug 55 contacts the lug 53 opposed thereto in its path of movement and this advances the skip-day wheel through a few degrees sufficient to shift actuating arm 39 to bring about a positive engagement between frictional surface 48 and the teeth 47a of gear 39a. The actuating arm 39 is locked to the hub 27 and, hence, rotates with the cycling wheel 18. The gear train between gear 16 and frictional surface 48 may be selected so as to rotate cycling member 18 through a full revolution for a preselected period of time, depending upon the size of gears employed, which may be on the order of three hours, as, for example, in a normal water softening regenerating cycle. During this full revolution of cycling member 18, the pins 20 of the cycling member contact the switch actuating arm 22 of switch 21 to energize the water softening valve motor at appropriate intervals and for appropriate times for the regeneration process. When the cycling wheel 18 makes a full revolution, the gap 49 is again opposed to the teeth of gear 39a and movement of the cycling wheel 18 then stops. At this position actuating arm 39 is positioned as in FIGURE 1 and ready for another cycling initiating step. It may be noted that in the idle position of cycling wheel 18 switch actuating arm 24 is seated in the recess 25 in the periphery of cycling wheel 18 so as to more or less restrain the cycling wheel in this position.

In order to hold the skip-day wheel 52 in proper position, a detent in the form of a yieldable spring member 58 may be positioned beneath cycling wheel 52 and formed so that a hump 59 of the spring 58 is received within a small recess underlying skip-day wheel 52. The recesses 60 are equally spaced about the axis of skip-day wheel 52 and are positioned so that the hump 59 of spring 58 is seated in a recess whenever a lug 53 is in proper position, as illustrated in FIGURE 1.

The time of day at which actuation of apparatus cycling wheel is started may be set by depressing push button 43 to disengage the drive from motor 13. Arm 39 is set to a position opposed to lugs 53, if not already in that position. Wheel 17 and lug 55 are then manually rotated to a position where lug 55 is snug against one of the lugs 53. Time indicating disc 32 is then rotated relative to wheel 17 until the time of day desired for the start of movement of cycling wheel is aligned with pointer 34. Wheel 17 is then rotated with the indicating disc 32 in the reverse direction from the first adjustment of wheel 17 until the correct time of day on disc 32 is opposite pointer 34. Push button 43 is then released to again establish the drive.

If it is desired manually to rotate cycling wheel 18, push button 43 is depressed to disengage gear 45 from the teeth 46 of time selector wheel 17 while also taking gear 39a out of alignment with frictional surface 48. Cycling wheel 18 may then be rotated simply by manually rotating actuating arm 39 to put the apparatus through a normal three-hour cycle and a shorter period of time for purposes of inspection, repair, or the like.

The invention may be modified by eliminating the sliding movement of shaft 41 under influence of push button 43. In this event, a shoulder may be positioned on shaft 41 so as to abut against bearing 44 and prevent axial movement of the shaft to the right as viewed in FIGURE 3, or, as an alternative, bearing 44 may be eliminated while a collar is placed between gear 45 and the opposed end face of bearing 42 to prevent inward movement of the shaft 41, push button 43 and gears carried therewith to the right in FIGURE 3. A one-way clutch is then positioned between gear transmission 14 and shaft 15 to allow free rotation of gears 45 and 39a under influence of button 43. The time of day can then be set by rotating button 43 while the clutch "overrides" and prevents transmission of this rotating force to transmission 14 and motor 13.

Arm 39 is sufficiently large that it is easily observed. The position of arm 39 indicates the relative time in the water softening regenerative cycle.

What is claimed is:

1. Time control mechanism for initiating the automatic cycling of apparatus including an apparatus cycling member and means for rotatably mounting said member, apparatus actuating means adapted for actuation by said member during rotation of said member, a timing motor and a time selector wheel driven by said motor, means for rotatably mounting said time selector wheel, drive means between said motor and time selector wheel for continuously rotating said time selector wheel, a clutching element movably mounted adjacent the path of movement of said selector wheel, an actuating element mounted for rotation with said cycling member and movable into and out of a position opposed to said clutching element, means carried by said time selector wheel for contacting said clutching element to cause said clutching element to contact said actuating element and cause a predetermined partial rotation of the same at a preselected time instant governed by the position of said time selector wheel, a driven wheel carried with said cycling member and having a smooth elastomeric peripheral surface, and frictional means driven by said drive means and engageable with said surface of said driven wheel for rotating the same, said driven wheel having a gap in its periphery whereby said frictional means and driven wheel are disengaged when said gap is opposed to said frictional means.

2. The structure of claim 1 wherein said frictional means is a gear in a train of gears between said motor and said time selector wheel.

3. The structure of claim 1 wherein said cycling member has a recess formed in the periphery thereof and a spring arm seats in said recess when said actuating element is opposed to said clutching element.

4. The structure of claim 1 wherein said means carried by said selector wheel is in the form of a pin.

5. Time control mechanism for initiating the automatic cycling of apparatus including an apparatus cycling member and means for rotatably mounting said member, apparatus actuating means adapted for actuation by said member during rotation of said member, a timing motor and a time selector wheel driven by said motor, means for rotatably mounting said time selector wheel, drive means between said motor and time selector wheel for continuously rotating said time selector wheel, an actuating element mounted for rotation with said cycling member, means carried by said time selector wheel for causing a predetermined partial rotation of said actuating element at a preselected time instant governed by the position of said time selector wheel, a driven wheel having an elastomeric peripheral surface carried with said cycling member, a gear in said drive means for engaging said surface of said wheel, said driven wheel having a gap in a portion of its periphery so that said gear is out of engagement with said driven wheel when said gear is opposed to said gap, and means for selectively disengaging the drive between said motor and selector wheel to allow rotation of said selector wheel irrespective of rotation of said motor.

6. Time control mechanism for initiating the automatic cycling of apparatus including an apparatus cycling member and means for rotatably mounting said member, apparatus actuating means adapted for actuation by said member during rotation of said member, a timing motor and a time selector wheel driven by said motor, means for rotatably mounting said time selector wheel, drive means between said motor and time selector wheel for continuously rotating said time selector wheel, a clutching element movably mounted adjacent the path of movement of said selector wheel, an actuating element mounted for rotation with said cycling member and movable into and out of a position opposed to said clutching element, means carried by said time selector wheel for contacting said clutching element to cause said clutching element to contact said actuating element and cause a predetermined partial rotation of the same at a preselected time instant governed by the position of said time selector wheel, a driven wheel carried with said cycling member and having a smooth peripheral surface, frictional means in the form of a gear driven by said drive means and engageable with said surface of said driven wheel for rotating the same, said driven wheel having a gap in its periphery whereby said frictional means and driven wheel are disengaged when said gap is opposed to said driven gear, said cycling member, time selector wheel, actuating element, and driven wheel being positioned coaxially, and bearing means fixed to a support for supporting said cycling member, time selector wheel, actuating element, and driven wheel for rotation thereon.

7. Time control mechanism for initiating the automatic cycling of apparatus including an apparatus cycling member and means for rotatably mounting said member, apparatus actuating means adapted for actuation by said member during rotation of said member, a timing motor and a time selector wheel driven by said motor, means for rotatably mounting said time selector wheel, drive means between said motor and time selector wheel for continuously rotating said time selector wheel, a clutching element movably mounted adjacent the path of movement of said selector wheel, an actuating element mounted for rotation with said cycling member and movable into and out of a position opposed to said clutching element, means carried by said time selector wheel for contacting said clutching element to cause said clutching element to contact said actuating element and cause a predetermined partial rotation of the same at a preselected time instant governed by the position of said time selector wheel, a driven wheel carried with said cycling member and having a smooth peripheral surface, said drive means including frictional means in the form of a gear driven thereby and a second gear positioned coaxially with said frictional means and rotatable therewith, said gear being engageable with a gear on said time selector wheel, said frictional means and said second gear being supported in a bearing for sliding movement along the axis thereof, said frictional means being engageable with said surface of said driven wheel, said driven wheel having a gap in its periphery whereby said frictional means and driven wheel are disengaged when said gap is opposed to said driven gear, and spring means for retaining said second gear in a normal driving engagement with said gear of said time selector wheel, said frictional means and said gear being movable to a position where said frictional means is out of opposed relation to said driven wheel and said gear is out of opposed relation to said gear carried by said time selector wheel.

8. Time control mechanism for initiating the automatic cycling of apparatus including an apparatus cycling member and means for rotatably mounting said member, apparatus actuating means adapted for actuation by said member during rotation of said member, a timing motor and a time selector wheel driven by said motor, means for rotatably mounting said time selector wheel, drive means between said motor and time selector wheel for continuously rotating said time selector wheel, a clutching element including a plurality of circumferentially spaced lugs positioned on a rotatably mounted member, said clutching element being mounted for rotation adjacent the path of movement of said selector wheel, said rotatably mounted member including releasable holding means for permitting advance of said clutching element through a circumferential distance equivalent to the spacing between said lugs and thereupon again releasably restraining said clutching element, an actuating element mounted for rotation with said cycling member and movable into and out of a position opposed to said clutching element, means carried by said time selector wheel for contacting said clutching element to cause said clutching element to contact said actuating element and cause a predetermined partial rotation of the same at a preselected time instant governed by the position of said time selector wheel, a driven wheel carried with said cycling member and having a smooth peripheral surface, and frictional means in the form of a gear driven by said drive means and engageable with said surface of said driven wheel, said driven wheel having a gap in its periphery whereby said frictional means and driven wheel are disengaged when said gap is opposed to said driven gear.

9. Time control mechanism for initiating the automatic cycling of apparatus including an apparatus cycling member and means for rotatably mounting said member, apparatus actuating means adapted for actuation by said member during rotation of said member, a timing motor and a time selector wheel driven by said motor, means for rotatably mounting said time selector wheel, drive means between said motor and time selector wheel for continuously rotating said time selector wheel, a clutching element movably mounted adjacent the path of movement of said selector wheel, an actuating element mounted for rotation with said cycling member and movable into and out of a position opposed to said clutching element, means carried by said time selector wheel for contacting said clutching element to cause said clutching element to contact said actuating element and cause a predetermined partial rotation of the same at a preselected time instant governed by the position of said time selector wheel, a driven wheel carried with said cycling member and having a smooth peripheral surface, frictional means in the form of a gear driven by said drive means and engageable with said surface of said driven wheel, said driven wheel having a gap in its periphery whereby said frictional means and driven wheel are disengaged when said gap is opposed to said driven gear, said clutching element including a plurality of circumferentially spaced lugs engageable with said means carried by said selector wheel, each of said lugs having a pin removably mounted therein and movable with said clutching element into individual contact with said actuating element.

10. The structure of claim 1 wherein said frictional means is in the form of a gear mounted for rotation at a position to one side of said driven wheel.

References Cited

UNITED STATES PATENTS 2,017,139   10/1935   Wood.
3,220,264   11/1965   Haydon _____ 74—3.52
3,302,467   2/1967   Prosser _____ 74—3.5

MILTON KAUFMAN, Primary Examiner

U.S. Cl. X.R.

200—38